Patented Mar. 2, 1954

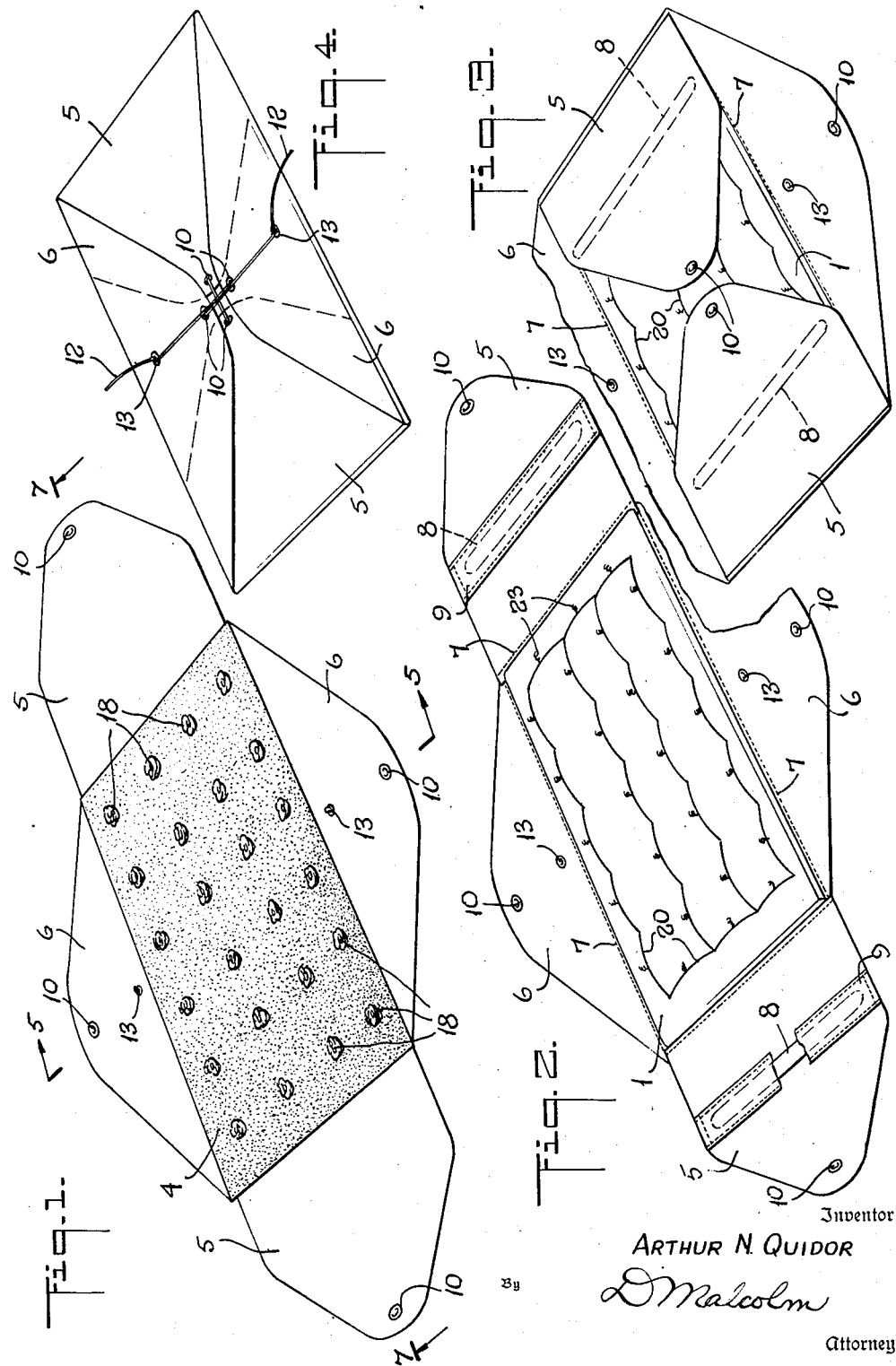

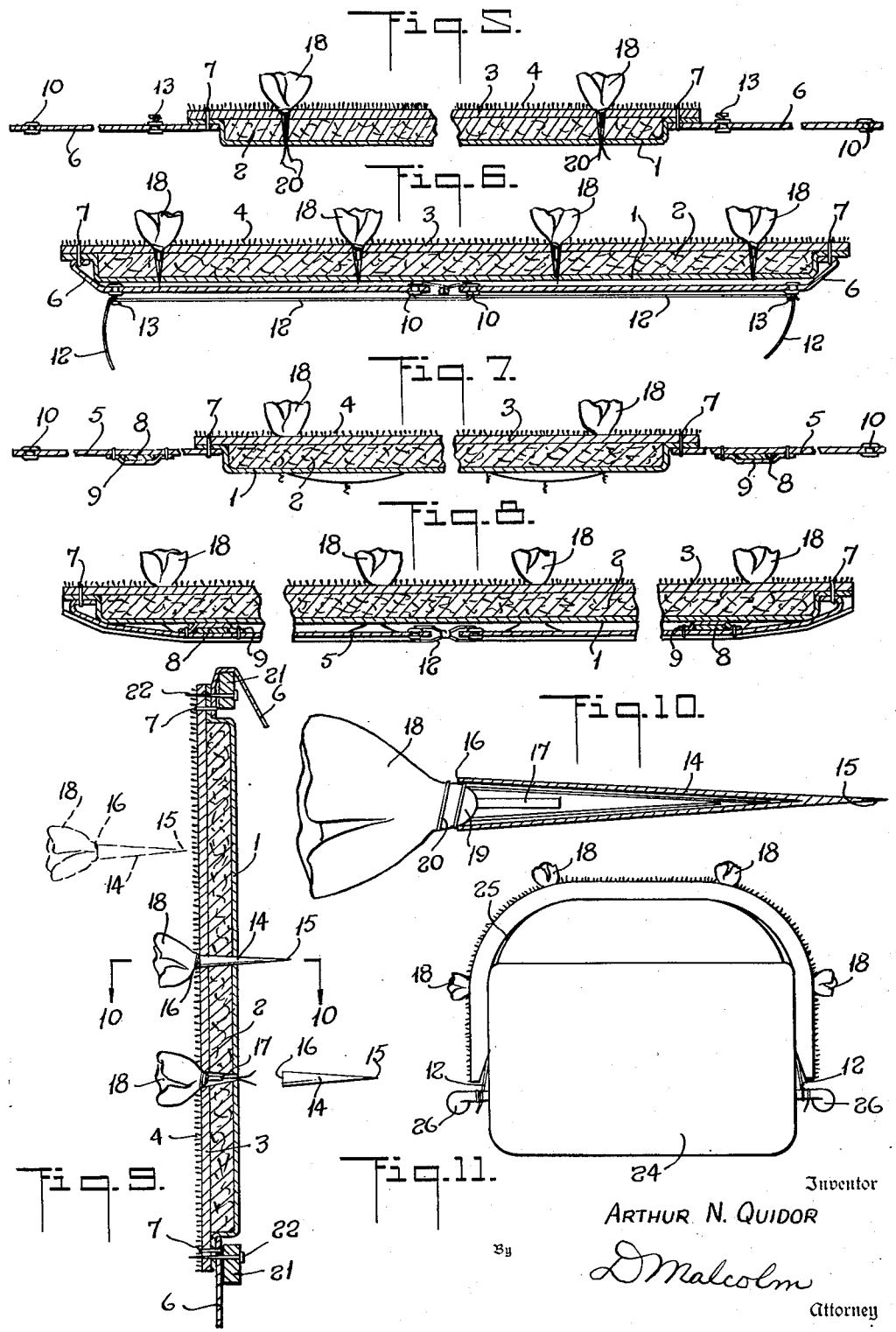

2,670,518

UNITED STATES PATENT OFFICE 2,670,518

FLORAL BLANKET

Arthur N. Quidor, New York, N. Y.

Application August 16, 1952, Serial No. 304,759

5 Claims. (Cl. 27—19)

This invention relates to floral blankets, wreaths and similar floral display forms, and to a novel and improved method of making same.

An object of the invention is to simplify the construction and reduce the cost of floral blankets and displays of the above type.

Another object is to provide a simple and inexpensive blanket, base or form, of any desired shape or size, which may be sold to florists and others as a complete self-contained unit without flowers, and to which the florist may easily and quickly affix any desired species and arrangement of flowers for any desired purpose.

Various other objects and advantages will be apparent as the nature of the invention is more fully disclosed.

The embodiment of the invention disclosed herein for purposes of illustration comprises a rectangular floral blanket of the type commonly employed for draping caskets, monuments, etc., although it will be evident as the description proceeds that the invention is equally applicable to the construction of ornamental displays of any shape or size, and for any purpose.

The blanket may comprise a base of thin cloth preferably having a facing of artificial grass, and a somewhat thicker backing layer or mat containing lightly packed excelsior, cotton or other soft pliable material which is very easily pierced by a sharp-pointed tool.

For inserting flowers in the blanket, I provide a hollow sharp-pointed tapered or cone-shaped tool as hereinafter described. Every flower, for example a carnation, has a stem which is joined to the head of the flower by a thick pod-like portion known as the "receptacle." The florist winds a piece of wire around the receptacle or upper stem of a flower, leaving two equal free ends of the wire depending alongside the stem. He then inserts the stem of the flower and the depending ends of the wire into the hollow cone-shaped tool, the open end of which may be large enough to admit the receptacle, but not the head, of the flower.

The sharp-pointed tool containing the flower is now inserted through the face and backing layer of the blanket, piercing same like a needle. The tool is pulled out through the backing layer of the blanket so that the stem of the flower and the depending ends of the wire project through the back of the blanket while the head of the flower rests upright in the artificial grass face with the pod-like receptacle of the flower nestled in the hole created by the tool. The florist repeats this procedure with as many flowers, of similar or varied species and colors, as are necessary to create the desired floral design on the face of the blanket. Any conceivable design may be wrought, according to the desires and artistic talents of the florist. The free ends of the wires depending from each flower at the back of the blanket are fastened, for example simply by twisting, to the wires of the adjacent flowers, securing same together and avoiding any possibility of displacement.

The back of the blanket contains a plurality of flaps, which, in the case of a rectangular blanket of the type mentioned above, preferably consist of four generally triangular cloth flaps stitched to the respective linear edges of the blanket and adapted to be folded like the back flaps of an envelope and fastened together to cover and conceal the wired stems of the flowers.

Another feature of the invention consists in providing certain of the above-mentioned back flaps of the blanket with pliable portions or inserts, such as thin strips of pliable metal, whereby the blanket may be shaped to conform with any surface, such as a curved surface, upon which it is mounted. In appropriate cases strings or ribbons, employed to close the back flaps of the blanket, may also serve to secure the blanket to the object on which it is placed.

Although the novel features which are characteristic of this invention are set forth more in detail in the claims appended hereto, the nature and scope of the invention may be better understood by referring to the following description, taken in connection with the accompanying drawings forming a part thereof, in which certain specific embodiments have been set forth for purposes of illustration.

In the drawings:

Fig. 1 is a perspective view showing the front of a floral blanket embodying my invention, with the above-mentioned flaps in open position;

Fig. 2 is a corresponding rear view, with portions broken away to show details of construction;

Fig. 3 is a perspective view similar to Fig. 2 but with the two end flaps closed;

Fig. 4 is a similar view showing all four back flaps closed and secured together;

Fig. 5 is an enlarged transverse section taken on line 5—5 of Fig. 1, with the back flaps open;

Fig. 6 is a similar view with the flaps closed;

Fig. 7 is an enlarged longitudinal section taken on line 7—7 of Fig. 1, with the back flaps open;

Fig. 8 is a similar view with the flaps closed;

Fig. 9 is a transverse section showing the floral blanket mounted on a temporary support, and illustrates the method of inserting the flowers therein;

Fig. 10 is an enlarged longitudinal section through the flower-inserting tool, taken on line 10—10 of Fig. 9; and Fig. 11 is an end view of a casket showing the floral blanket draped thereon.

In the following description certain specific terms are used for convenience in referring to the various details of the invention. These terms, however, are to be interpreted as broadly as the state of the art will permit.

The floral blanket shown in the drawings for the purpose of illustrating the invention comprises an elongated rectangular envelope or integument 1 containing a soft pliable filling 2 of lightly packed excelsior, cotton batting or the like, secured to an outer rectangular sheet of fabric 3 which extends out slightly beyond the edges of the body of envelope 1 and may constitute the outer covering of said envelope. The sheet 3 may have an ornamental design or facing, for example it may have a facing of artifical grass 4, according to the purpose for which the floral blanket is to be used. The envelope 1, filling 2 and outer sheet or cover 3 form a mat which is readily pierced by a sharp-pointed tool for the insertion of natural or artificial flowers, as hereinafter described.

A pair of end flaps 5 and a pair of side flaps 6 are secured as by stitches 7 to the respective outer linear edges of the envelope and outer covering 3. These four flaps are adapted to fold rearwardly over the envelope 1 to substantially enclose and conceal same. Fig. 3 shows the end flaps 5 in folded position, with the side flaps 6 still open; while Fig. 4 shows the side flaps 6 folded over the closed end flaps 5. The flaps resemble the flaps on the back of a letter envelope, their free end portions being generally triangular and shaped to substantially meet at the back of the envelope as shown in Fig. 4.

In the embodiment illustrated, the end flaps 5 have elongated thin strips 8 of tin, zinc or other pliable metal encased in cloth pockets 9 which are stitched on the inner sides of said flaps, as shown in Fig. 2. In this embodiment the metal strips 8 are arranged parallel to each other, and their purpose is to enable the blanket to readily conform with any surface, such as a curved surface, upon which it may be placed. The meeting end portions of the four flaps 5 and 6 contain eyelets 10, and a string or ribbon 12 may be inserted through these eyelets to draw the flaps together. When the flaps are closed as shown in Fig. 4, the string 12 is first inserted upwardly through the eyelets 10 of end flaps 5 and the two ends of the string are then tied together; the free ends of the tied string are then inserted upwardly through the eyelets 10 of side flaps 6, whereupon the ends of said string are drawn in opposite directions to pull the flaps 6 together and are looped around small studs or hooks 13 on flaps 6 as shown in Fig. 4, leaving the ends of said string 12 free for attachment to the handles of a casket, or to any other external object, as hereinafter more fully described.

The tool employed for inserting flowers in the floral blanket, and the method of insertion, are best illustrated in Figs. 9 and 10. In the embodiment illustrated, the tool comprises an elongated straight hollow cone 14 having its small end or apex 15 sharply pointed, its opposite open end 16 large enough to admit the portion of the flower beneath the head but too small to admit the head itself, and having the hollow inner portion between the ends of the tool long enough and wide enough to receive the stem of the flower.

Flowers, such as those shown in the drawings, each have a stem 17 which is joined to the head or petal portion 18 of the flower by an enlarged pod-like portion 19 known as the "receptacle." According to the present invention the florist wraps a wire 20 around the receptacle 19 of a flower, leaving two substantially equal free ends or strands of the wire depending alongside the stem 17. The stem 17 of the flower and the depending ends of the wire 20 are then inserted into the open end 16 of tool 14, as shown in Fig. 10. The open end 16 of the tool is preferably large enough to admit the receptacle 19 of the flower but is too small to admit the head 18.

For convenience in inserting the flowers in the blanket, the florist may prefer to mount the blanket on a support of any suitable type, for example on the frame 21 shown in Fig. 9. This is simply a rectangular frame of the type commonly employed for drying or stretching lace curtains, and is provided with a plurality of pins 22 or other suitable fastening members for holding the blanket on the frame. When so supported, the flaps 5 and 6 of the blanket are open as in Figs. 1, 2, 5, 7 and 9.

The tool 14 containing the flower (Fig. 10) is inserted through the face 3 and thence through the envelope 1 of the blanket. Fig. 9 shows the tool in three positions: first, the tool about to be inserted in the blanket; second, the tool, still containing the flower inserted in the blanket; and third, the tool pulled completely out through the back of the blanket. In this third or final step illustrated at the bottom of Fig. 9 the head 18 of the flower rests upright in the artificial grass facing 4 due to the fact that the receptacle 19 of the flower nestles in the hole which the tool formed in the blanket, and the two-strand wire 20 projects through the back of the blanket as best shown in Figs. 5 and 9. The stem 17 of the flower need not be long enough to extend all the way through the blanket. The florist repeats the foregoing procedure with as many flowers as are necessary to create the desired floral design on the face of the blanket, that shown in Fig. 1 being a simple design which will serve to illustrate the invention.

The free ends of wires 20, which depend from each flower and extend through the blanket as shown in Fig. 5, are fastened preferably by twisting them at 23 to the ends of the wires of adjacent flowers, as shown in Fig. 2, thus securing the flowers to the blanket. The flaps 5 and 6 of the blanket are closed as previously described, leaving the ends of the tie-string 12 free as shown in Fig. 4.

Fig. 11 shows a conventional casket 24 having a rounded top 25 and side handles 26. The floral blanket is draped over the top of the casket and the ends of the tie string 12 are tied to the handles 26 of the casket to prevent the blanket from slipping. With the blanket in this position, the pliable metal strips 8 concealed within the blanket extend transversely over the top 25 of the casket and are readily bent to conform to its rounded contour, with the result that said strips 8 conform the entire blanket to the shape of the casket as shown in Fig. 11 which keeps it from slipping.

Although certain specific embodiments have been shown and described herein for purposes of illustration, it will be evident to those skilled in

The invention claimed is:

1. A floral blanket comprising a mat of soft pliable material which is readily pierced by a sharp-pointed tool, an outer facing of artificial grass on said mat, flaps secured to the edge of said mat and foldable rearwardly to substantially enclose and conceal the back of the mat, the free end portions of said flaps being shaped to substantially meet at the back of said mat, means for securing said flaps together at the back of the mat, a plurality of flowers having their heads seated in upright position in the artificial grass facing of said mat, their stems piercing said mat and the portions between said heads and stems resting in individual holes in said mat, and two-ended wires secured to said flowers beneath the heads thereof and having each end of each wire fastened to a wire of an adjacent flower to secure said flowers to said mat.

2. A floral blanket comprising a rectangular envelope containing a soft pliable filling which is readily pierced by a sharp-pointed tool, an outer rectangular sheet having an ornamental facing secured to said envelope and extending slightly beyond the edges thereof, flaps secured to the linear edges of said outer sheet and foldable rearwardly over said envelope to substantially enclose and conceal same at the back, the free end portions of said flaps being shaped to substantially meet at the back of said envelope, strips of pliable metal on the inner sides of at least two opposite flaps to conform said blanket to the shape of an object on which it is placed, and means for securing said flaps together at the back of the blanket.

3. A floral blanket comprising a rectangular envelope containing a soft pliable filling which is readily pierced by a sharp-pointed tool, an outer rectangular sheet having a facing of artificial grass secured to said envelope and extending slightly beyond the edges thereof, flaps secured to the linear edges of said outer sheet and foldable rearwardly over said envelope to substantially enclose and conceal the latter, the free end portions of said flaps being generally triangular and shaped to substantially meet at the back of said envelope, elongated strips of pliable metal secured parallel to each other on the inner sides of at least two opposite flaps, fastening members on the meeting end portions of said flaps, and means engageable with said fastening members to draw said flaps together.

4. A floral blanket comprising a rectangular envelope containing a soft pliable filling which is readily pierced by a sharp-pointed tool, an outer rectangular sheet having a facing of artificial grass secured to said envelope and extending slightly beyond the edges thereof, flaps secured to the linear edges of said outer sheet and foldable rearwardly over said envelope to substantially enclose and conceal the latter, the free end portions of said flaps being generally triangular and shaped to substantially meet at the back of said envelope, elongated strips of pliable metal secured parallel to each other on the inner sides of at least two opposite flaps, eyelets in the meeting end portions of said flaps, a string insertable through said eyelets to draw said flaps together, and means for securing said string to two opposite flaps while leaving the ends of said string free for tying to an external object.

5. A floral blanket comprising a rectangular envelope containing a soft pliable filling which is readily pierced by a sharp-pointed tool, an outer rectangular sheet of fabric having a facing of artificial grass secured to said envelope and extending slightly beyond the edges thereof, flaps secured to the linear edges of said outer sheet of fabric and foldable rearwardly over said envelope to substantially enclose and conceal the latter, the free end portions of said flaps being generally triangular and shaped to substantially meet at the back of said envelope, elongated strips of pliable metal secured parallel to each other on the inner sides of at least two opposite flaps, eyelets in the meeting end portions of said flaps, a string insertable through said eyelets to draw said flaps together, means for securing said string to two opposite flaps while leaving the ends of said string free for tying to an external object, a plurality of flowers having their heads seated in the artificial grass facing of said blanket and their stems piercing said outer sheet and said envelope, and two-end wires secured to said flowers beneath the heads thereof and having each end of each wire fastened to a wire of an adjacent flower to secure said flowers to said blanket.

ARTHUR N. QUIDOR.

References Cited in the file of this patent

UNITED STATES PATENTS

| Number | Name | Date |
| --- | --- | --- |
| 1,327,856 | Bray | Jan. 13, 1920 |
| 1,518,618 | Waters | Dec. 9, 1924 |
| 1,882,986 | Schroeder | Oct. 18, 1932 |
| 1,904,470 | Kelman | Apr. 18, 1933 |
| 1,950,269 | Rogers | Mar. 6, 1934 |
| 2,112,176 | Olsson | Mar. 22, 1938 |
| 2,366,377 | Zois | Jan. 2, 1945 |